(12) United States Patent
Tabuchi et al.

(10) Patent No.: US 12,218,553 B2
(45) Date of Patent: Feb. 4, 2025

(54) STATOR FOR ELECTRIC MOTOR (71) Applicant: TOYOTA JIDOSHA KABUSHIKI KAISHA, Aichi-ken (JP)

(72) Inventors: Kenta Tabuchi, Toyota (JP); Hiroki Kato, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 200 days.

(21) Appl. No.: 18/171,679

(22) Filed: Feb. 21, 2023

(65) Prior Publication Data

US 2023/0268808 A1     Aug. 24, 2023

(30) Foreign Application Priority Data

Feb. 24, 2022   (JP) ................... 2022-027246

(51) Int. Cl.
  *H02K 11/25*   (2016.01)
  *H02K 3/50*    (2006.01)
(52) U.S. Cl.
  CPC ............ *H02K 11/25* (2016.01); *H02K 3/50* (2013.01); *H02K 2203/09* (2013.01)
(58) Field of Classification Search
  CPC ....... H02K 3/50; H02K 11/25; H02K 2203/09
  USPC ...................................... 310/68 C
  See application file for complete search history.

(56) References Cited

U.S. PATENT DOCUMENTS

| | | | | |
|---|---|---|---|---|
| 2011/0285220 | A1* | 11/2011 | Sonohara | H02K 9/00 310/53 |
| 2012/0086292 | A1* | 4/2012 | Ishida | H02K 11/25 310/71 |
| 2013/0270973 | A1* | 10/2013 | Ikemoto | H02K 11/25 310/68 C |
| 2017/0054346 | A1* | 2/2017 | Matsumoto | H02K 1/146 |
| 2021/0211023 | A1* | 7/2021 | Schmitt | H02K 3/522 |
| 2022/0029498 | A1* | 1/2022 | Lee | H02K 3/522 |
| 2022/0271596 | A1* | 8/2022 | Takahashi | H02K 3/04 |
| 2022/0320971 | A1* | 10/2022 | Akaba | G01K 7/22 |
| 2022/0352784 | A1* | 11/2022 | Faverolle | H02K 3/50 |
| 2022/0385131 | A1* | 12/2022 | Takeda | H02K 3/12 |
| 2022/0385132 | A1* | 12/2022 | Takei | H02K 3/50 |
| 2023/0034343 | A1* | 2/2023 | Kashiwada | H02K 3/50 |
| 2023/0119735 | A1* | 4/2023 | Chikaraishi | H02K 1/16 310/216.001 |
| 2023/0134155 | A1* | 5/2023 | Kumagai | H02K 3/50 310/52 |

(Continued)

FOREIGN PATENT DOCUMENTS

JP     2021114877 A     8/2021
JP     2021-182801 A   11/2021

*Primary Examiner* — Rashad H Johnson
(74) *Attorney, Agent, or Firm* — HAUPTMAN HAM, LLP (57) ABSTRACT

A stator for an electric motor includes: (a) a tubular stator core having slots provided through the stator core in a direction of a rotation axis of the stator core; (b) coils inserted through the slots; (c) a conductive member electrically connected to the coils; (d) a temperature sensor attached to the conductive member; and (e) a resin portion provided to cover at least a part of the conductive member and at least a part of the temperature sensor. The conductive member is provided with a hole that extends in the direction of the rotation axis of the stator core. The temperature sensor is inserted, at least its portion, in the hole.

4 Claims, 6 Drawing Sheets

(56) References Cited

U.S. PATENT DOCUMENTS

| | | | |
|---|---|---|---|
| 2023/0135939 A1* | 5/2023 | Ito | G01K 7/22 |
| | | | 310/71 |
| 2023/0283138 A1* | 9/2023 | Tsuji | H02K 3/50 |
| | | | 310/71 |
| 2023/0283149 A1* | 9/2023 | Kondo | H02K 3/38 |
| | | | 310/52 |
| 2023/0327523 A1* | 10/2023 | Yasutomi | H02K 11/25 |
| | | | 310/68 R |
| 2024/0014713 A1* | 1/2024 | Yamada | H02K 11/25 |
| 2024/0258852 A1* | 8/2024 | Niwa | H02K 3/522 |

* cited by examiner

STATOR FOR ELECTRIC MOTOR

This application claims priority from Japanese Patent Application No. 2022-027246 filed on Feb. 24, 2022, the disclosure of which is herein incorporated by reference in its entirety.

FIELD OF THE INVENTION

The present invention relates to a structure for attaching a temperature sensor to a stator for an electric motor.

BACKGROUND OF THE INVENTION

JP-2021-114877A discloses a structure for attaching a temperature sensor to a stator, which is to constitute a part of an electric motor. Specifically, in the structure disclosed in this Japan Patent Application Publication, the temperature sensor is attached to a conductive member connected to a stator coil that is attached to a stator core. Further, in the disclosed structure, distal end portions of the stator coil protruding from the stator core in a direction of a rotation axis are welded to each other, and the welded portions are covered with resin so as to assure insulation of the welded portions. Moreover, the temperature sensor as well as the distal end portions of the stator coil is covered with the resin, for avoiding an element portion of the temperature sensor from being in contact with a refrigerant such as coolant oil, such that a temperature value measured by the temperature sensor does not become lower than an actual coil temperature value.

SUMMARY OF THE INVENTION

By the way, in the structure for attaching the temperature sensor, disclosed in the above-identified Japan Patent Application Publication, the conductive member is bent so as to include opposed portions opposed to each other, and the temperature sensor is held between the opposed portions of the conductive member, so that a thickness of a portion in which the temperature sensor is attached is increased, thereby problematically resulting in increase in size and increase in amount of the resin required to cover the temperature sensor and the conductive member.

The present invention was made in view of the background art described above. It is therefore an object of the present invention to provide a stator for an electric motor, wherein the stator includes a temperature sensor attached to a conductive member and covered with resin, and wherein the stator has a structure capable of suppressing increase in size and increase in amount of use of the resin.

The object indicated above is achieved according to the following aspects of the present invention.

According to a first aspect of the invention, there is provided a stator for an electric motor. The stator includes: (a) a tubular stator core having slots provided through the stator core in a direction of a rotation axis of the stator core; (b) coils inserted through the slots; (c) a conductive member electrically connected to the coils; (d) a temperature sensor attached to the conductive member; and (e) a resin portion provided to cover at least a part of the conductive member and at least a part of the temperature sensor. The conductive member is provided with a hole that extends in the direction of the rotation axis of the stator core. The temperature sensor is inserted, at at least its portion, in the hole.

According to a second aspect of the invention, in the stator according to the first aspect of the invention, the temperature sensor includes a base portion and a protrusion portion protruding from the base portion, wherein the protrusion portion of the temperature sensor is inserted in the hole.

According to a third aspect of the invention, in the stator according to the first or second aspect of the invention, the at least the portion of the temperature sensor is interference-fitted in the hole.

According to a fourth aspect of the invention, in the stator according to any one of the first through third aspects of the invention, the conductive member is a neutral busbar.

In the stator according to the first aspect of the invention, the temperature sensor is inserted in the hole provided in the conductive member, so that a thickness of a portion covered by the resin portion can be reduced by a distance by which the temperature sensor is inserted in the hole. Consequently, it is possible to reduce an amount of use of resin required to form the resin portion and to suppress increase of a size of the stator or the electric motor.

In the stator according to the second aspect of the invention, the protrusion portion protruding from the base portion is inserted in the hole. Thus, the distance by which the temperature sensor is inserted in the hole, i.e., a length of a portion of the temperature sensor which is inserted in the hole, can be made always constant.

In the stator according to the third aspect of the invention, the at least the portion of the temperature sensor is interference-fitted in the hole. Thus, it is possible to prevent the temperature sensor from being removed from the hole after the temperature sensor is attached to the neutral busbar. Further, since the temperature sensor is in close contact with the neutral busbar, it is possible to improve temperature followability of the temperature sensor.

In the stator according to the fourth aspect of the invention, the conductive member is the neutral busbar. Thus, it is possible to improve an accuracy of detection of the temperature of the electric motor, by detecting a temperature of the neutral busbar to which an electric current is constantly applied during running of a vehicle.

DETAILED DESCRIPTION OF PREFERRED EMBODIMENTS

There will be described embodiments of the present invention in details with reference to drawings. It is noted that figures of the drawings are simplified or deformed as needed, and each portion is not necessarily precisely depicted in terms of dimension ratio, shape, angle, etc., for easier understanding of each of the embodiments.

First Embodiment

Figure 1:
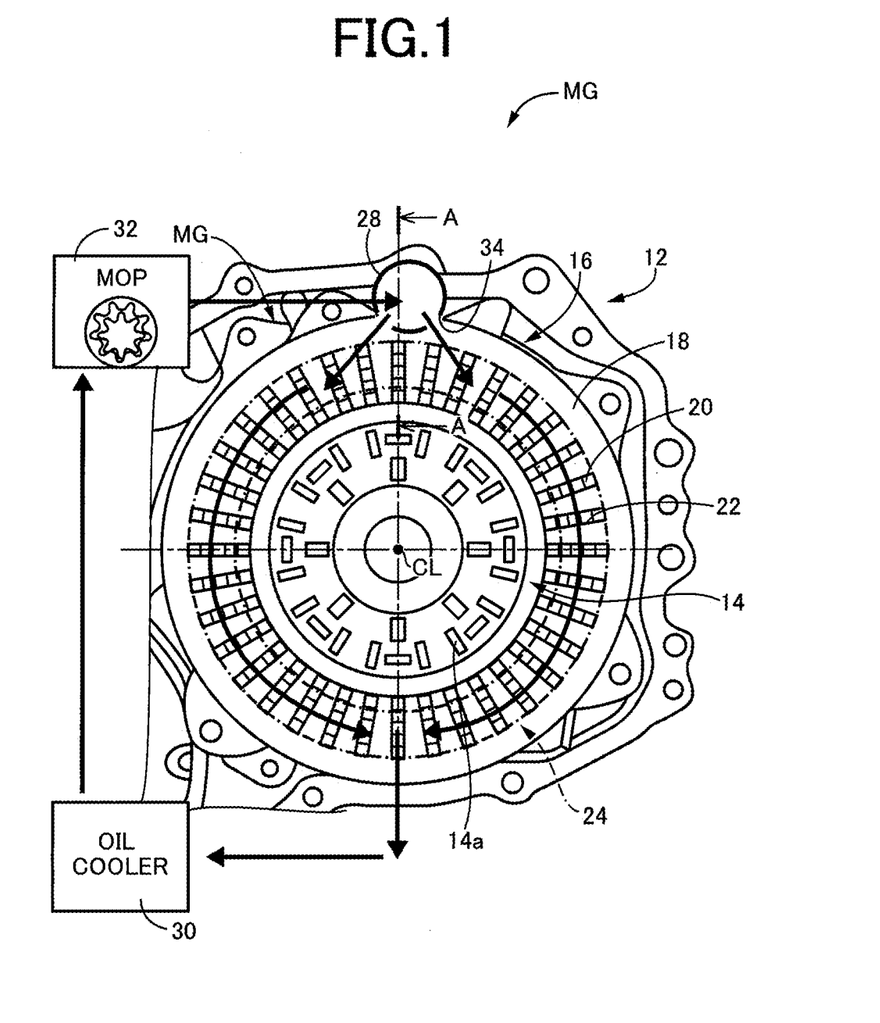
FIG. 1 is a view of an electric motor that is to be provided in a vehicle in an embodiment of the present invention, as viewed in a direction of a rotation axis of the electric motor.

FIG. 1 is a view of an electric motor MG that is to be provided in a vehicle in an embodiment of the present invention, as viewed in a direction of a rotation axis CL of the electric motor MG. The electric motor MG is disposed in a casing 12 as a non-rotary member, such that its center lies on the rotation axis CL. The electric motor MG includes a rotor 14 disposed to be rotatable about the rotation axis CL and a stator 16 disposed on an outer peripheral side of the rotor 14.

The rotor 14 has a cylindrical shape, and is rotatably held by the casing 12 through bearings (not shown) that are disposed on respective opposite sides of the rotor 14 in a direction of the rotation axis CL. The stator 16 has a tubular shape, and is fixed to the casing 12 through screw bolts (not shown). Thus, the stator 16 is unrotatably fixed to the casing 12. A predetermined amount of clearance is defined between the rotor 14 and the stator 16 in a radial direction of the rotor 14 and the stator 16.

A plurality of magnets 14a are provided inside the rotor 14. The stator 16 includes a tubular stator core 18 disposed around the rotation axis CL and a plurality of stator coils 20 extending through the stator core 18 in the direction of the rotation axis CL. Each of the stator coils 20 is provided by a conductive wire which has a rectangular cross-sectional shape and which is covered with an insulation film (not shown). A length of a side of each of the stator coils 20 is substantially equal to a width of each of slots 22. It is noted that the stator coils 20 correspond to "coils" recited in the appended claim.

The stator core 18 is constituted by a plurality of electromagnetic steel plates that are laminated on each other, so as to have a tubular shape. The plurality of slots 22 are provided in the stator core 18 such that slots 22 are arranged radially as viewed in the direction of the rotation axis CL. Each of the slots 22 is a cutout extending in the radial direction from an inner circumferential surface of the stator core 18 toward an outer circumferential surface of the stator core 18. The slots 22 are located at equal angular intervals in a circumferential direction of the stator core 18, and extend through the stator core 18 in the direction of the rotation axis CL.

Each of the slots 22 receives corresponding ones of the plurality of stator coils 20 which are inserted through each slot 22 and which are arranged in the radial direction as viewed in the direction of the rotation axis CL. Each of the stator coils 20, which extends through the stator core 18 in the direction of the rotation axis CL, has substantially a U-shape so that a pair of end portions of each stator coil 20 protrudes from an axial end face of the stator core 18 in the direction of the rotation axis CL. The end portions protruding from the axial end face of the stator core 18 are bundled to constitute a coil end 24 as indicated by one-dot chain line in FIG. 1. In the coil end 24, one of the end portions of each of the stator coils 20 and one of the end portions of another of the stator coils 20 are welded to constitute a welded portion 26 (see FIG. 2).

In a state in which the electric motor MG is installed in the vehicle, a coolant pipe 28 is located above the coil end 24 in a vertical direction of the vehicle, as shown in FIG. 1. A coolant oil (coolant fluid), which is cooled by passing through an oil cooler 30, is pumped up by a mechanical oil pump 32 so as to be supplied to the coolant pipe 28 that extends in the direction of the rotation axis CL.

In FIG. 1, arrows indicate flow of the coolant oil. The coolant pipe 28 is provided with a plurality of oil release holes 34, so that the coolant oil is released through the oil release holes 34. The coolant oil released from the oil release holes 34 scatters toward the coil end 24. The coolant oil adhering to the coil end 24 is moved downward along the coil end 24 as indicated by the arrows, and the coil end 24 is cooled at this time. Further, the coolant oil, which reaches a lower portion of the coil end 24 and is moved to a bottom of the casing 12, is cooled by the oil cooler 30, and is supplied to the coolant pipe 28 again through the mechanical oil pump 32. In this way, the coolant oil is circulated inside the casing 12 while cooling the coil end 24.

Figure 2:
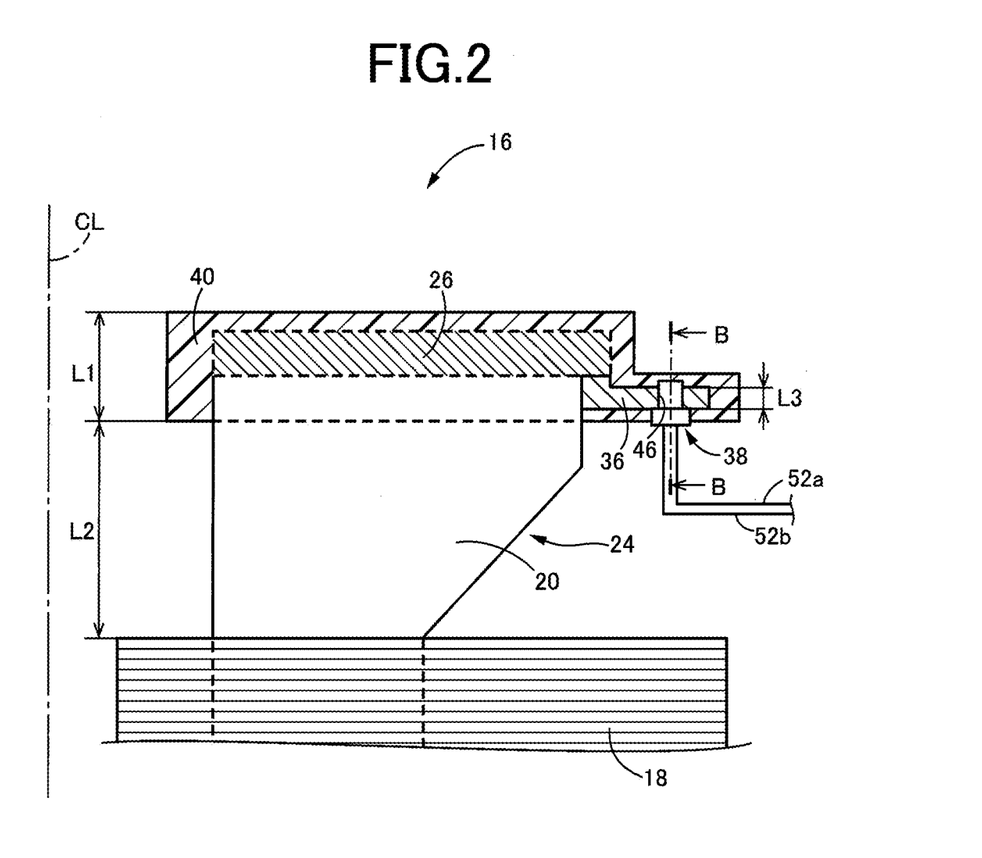
FIG. 2 is a view showing a cross section taken in line A-A in FIG. 1, in a simplified manner.

FIG. 2 is a view showing a cross section taken in line A-A in FIG. 1, in a simplified manner. In FIG. 2, a vertical direction of the drawing sheet corresponds to the direction of the rotation axis CL while a horizontal direction of the drawing sheet corresponds to the radial direction of the radial direction of the rotor 14 and the stator 16. As shown in FIG. 2, the coil end 24 is constituted by the end portions of the stator coils 20, which protrude from the axial end face of the stator core 18. In a distal end portion of the coil end 24, one of the end portions of each of the stator coils 20 and one of the end portions of another of the stator coils 20 are welded to constitute the welded portion 26. Each of the coil end 24 and the welded portion 26 has an annular body whose center lies on the rotation axis CL.

A neutral busbar 36 is provided to be electrically connected to the stator coils 20, and connect among a U-phase coil, a V-phase coil and a W-phase coil that constitute the stator coils 20, so as to constitute a neutral point of a Y connection of the three phase coils. Further, a temperature sensor 38 is attached to the neutral busbar 36, so as to detect a temperature of the electric motor MG. During an operation of the vehicle (including during stop of the vehicle as well as during running of the vehicle), an electric current is constantly supplied to the neutral busbar 36, so that an accuracy of detection of the temperature of the electric motor MG can be improved owing to the arrangement in which the temperature sensor 38 is attached to the neutral busbar 36. Further, since the temperature sensor 38 is provided within a space defined between the neutral busbar 36 and the stator core 18, it is possible to prevent increase of a size of the electric motor MG due to the provision of the temperature sensor 38. It is noted that the neutral busbar 36 corresponds to "conductive member" recited in the appended claims.

Further, in order to assure insulation of the welded portion 26 that is constituted by the distal end portions of the stator coils 20 that are welded to one another, the welded portion 26 is covered with a resin portion made 40 of resin. Moreover, the neutral busbar 36 and a part of the temperature sensor 38, as well as the welded portion 26, are covered with the resin portion 40, so as to prevent contact of the coolant oil with a vicinity of a thermistor element portion 48 (see FIG. 3) of the temperature sensor 38 attached to the neutral busbar 36, for avoiding reduction of the accuracy of the detection of the temperature of the temperature sensor 38. Thus, the resin portion 40 covers the welded portion 26, the neutral busbar 36 and the part of the temperature sensor 38.

As described above, the temperature sensor 38 is partially covered with the resin portion 40, so that a temperature value measured by the temperature sensor 38 is unlikely to be reduced by the coolant oil. However, the coverage of the temperature sensor 38 with the resin increases a thickness of the resin portion 40 measured in the direction of the rotation axis CL (that is represented by "L1" in FIG. 2), thereby resulting in increase of an amount of use of the resin. Further, where there is a limitation of a length of the electric motor MG in the direction of the rotation axis CL due to a restriction required for installing the electric motor MG in the vehicle, an axial length of the coil end 24 (that is represented by "L2" in FIG. 2) in the direction of the rotation axis CL, which can be cooled by the coolant coil, is made small relative to the thickness of the resin portion 40, thereby resulting in reduction of a surface area of the coil end 24 with which the coolant oil can be in contact. The reduction of the surface area of the coil end 24 leads to reduction of a cooling performance of the stator coils 20. In connection with this, there is a risk that the output torque of the electric motor MG could be problematically limited due to the temperature restriction of the stator coils 20.

Figure 3:
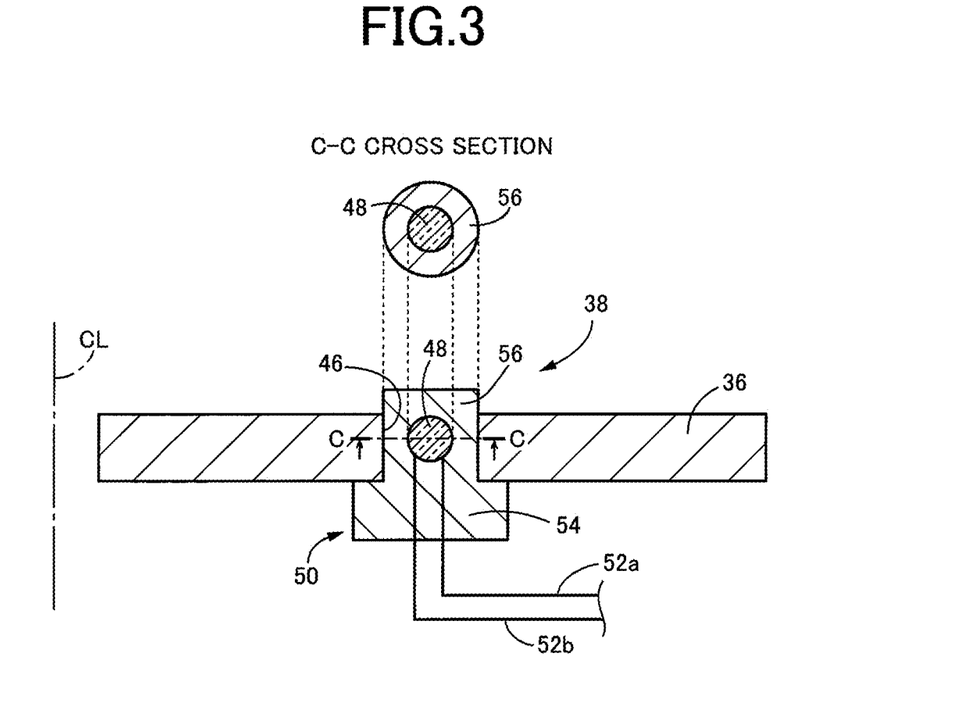
FIG. 3 is a cross sectional view taken in line B-B in FIG. 2.

For avoiding the above-described problems, the temperature sensor 38 is inserted, at least its portion, in a round hole 46 that is provided to extend through the neutral busbar 36. FIG. 3 is a cross sectional view taken in line B-B in FIG. 2. In FIG. 3, a vertical direction of the drawing sheet corresponds to the direction of the rotation axis CL. FIG. 3 further includes a cross sectional view of the temperature sensor 38 taken in line C-C. It is noted that the round hole 46 corresponds to "hole" recited in the appended claims.

The temperature sensor 38 includes the above-described thermistor element portion 48 and a sensor casing 50 provided to protect the thermistor element portion 48. The thermistor element portion 48 is provided in the sensor casing 50 made of resin. Further, two lead wires 52a, 52b are connected to the thermistor element portion 48.

The sensor casing 50 includes a plate-like base portion 54 having a predetermined thickness and a protrusion portion 56 protruding perpendicularly from the base portion 54 by a distance larger than a thickness of the neutral busbar 36, as shown in FIG. 3. Thus, the sensor casing 50 has a convex shape (stepped cylindrical shape) as a whole. The neutral busbar 36 has the predetermined thickness in the direction of the rotation axis CL. The neutral busbar 36 is provided with the round hole 46 extending in the direction of the rotation axis CL, i.e., a thickness direction of the neutral busbar 36.

The protrusion portion 56 of the temperature sensor 38 is inserted in the round hole 46 provided in the neutral busbar 36 and having a circular cross-sectional shape. The temperature sensor 38 is inserted in the round hole 46 so as to be positioned relative to the neutral busbar 36 in a position that makes the base portion 54 of the sensor casing 50 brought into contact with the neutral busbar 36.

Therefore, as shown in FIG. 2, the thickness L1 of the resin portion 40 can be reduced by a distance L3 by which the temperature sensor 38 is inserted in the round hole 46, thereby making it possible to reduce the amount of use of the resin required to form the resin portion 40. Further, even in a case in which, due to an issue of mountability of the electric motor MG, there is a limitation on a length of a portion of the electric motor MG, which protrudes from the stator core 18 in the direction of the rotation axis CL, the axial length L2 of the coil end 24, which can be cooled by the coolant coil, can be made large relative to the thickness L1 of the resin portion 40, because the thickness L1 can be reduced as described above. Consequently, the surface area of the coil end 24 with which the coolant oil can be in contact is increased whereby the electric motor MG can be cooled by the coolant oil with an improved cooling performance. In this connection, it is possible to reduce a limitation on an output of the electric motor MG due to heat generated by the electric motor MG, and to make the electric motor MG more compact in size.

Figure 4:
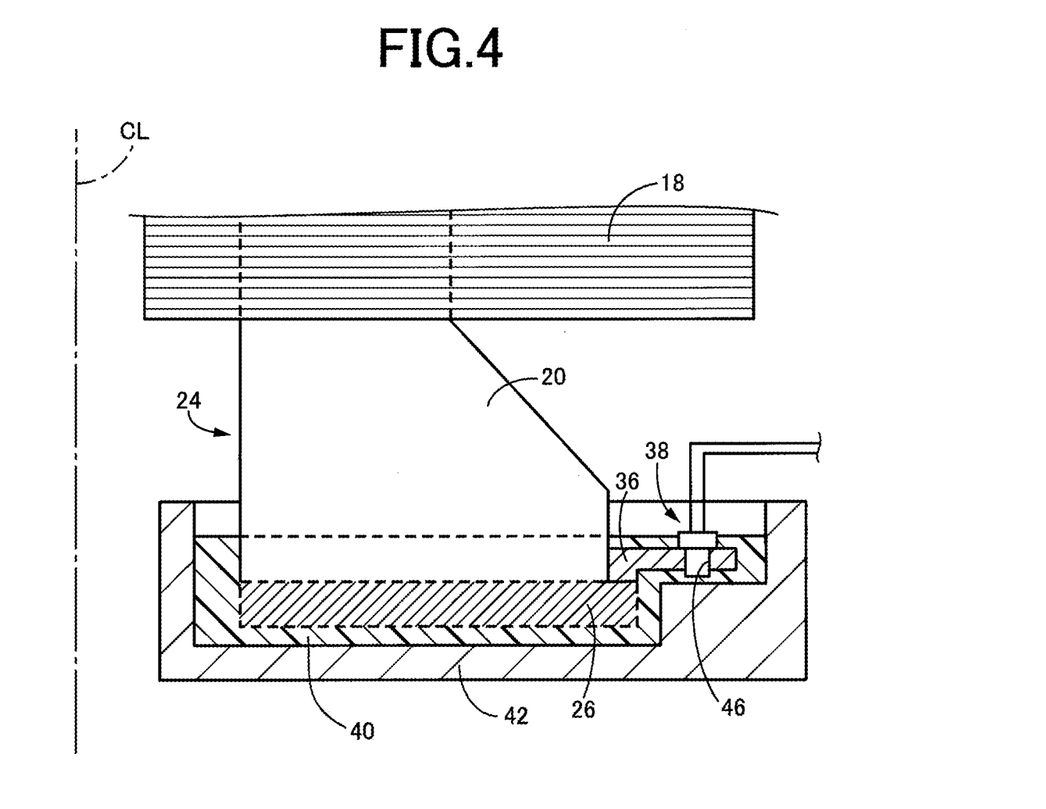
FIG. 4 is a view showing a process of covering a welded portion, a neutral busbar and a temperature sensor, with a resin portion, when the electric motor of FIG. 1 is to be manufactured.

FIG. 4 is a view showing a process of forming the resin portion 40, i.e., a process of covering the welded portion 26, the neutral busbar 36 and the temperature sensor 38, with the resin portion 40, when the electric motor MG is to be manufactured. In FIG. 4, a downward direction of the drawing sheet corresponds to a downward direction during the covering process. When the resin portion 40 is to be formed, a mould 42 is filled with a liquid resin, and the welded portion 26, the neutral busbar 36 and the temperature sensor 38 (that is attached to the neutral busbar 36) are immersed into the liquid resin in the mould 42. Then, with the liquid resin being cured, the resin portion 40 is formed such that the welded portion 26, the neutral busbar 36 and the temperature sensor 38 are covered by the formed resin portion 40.

Figure 5:
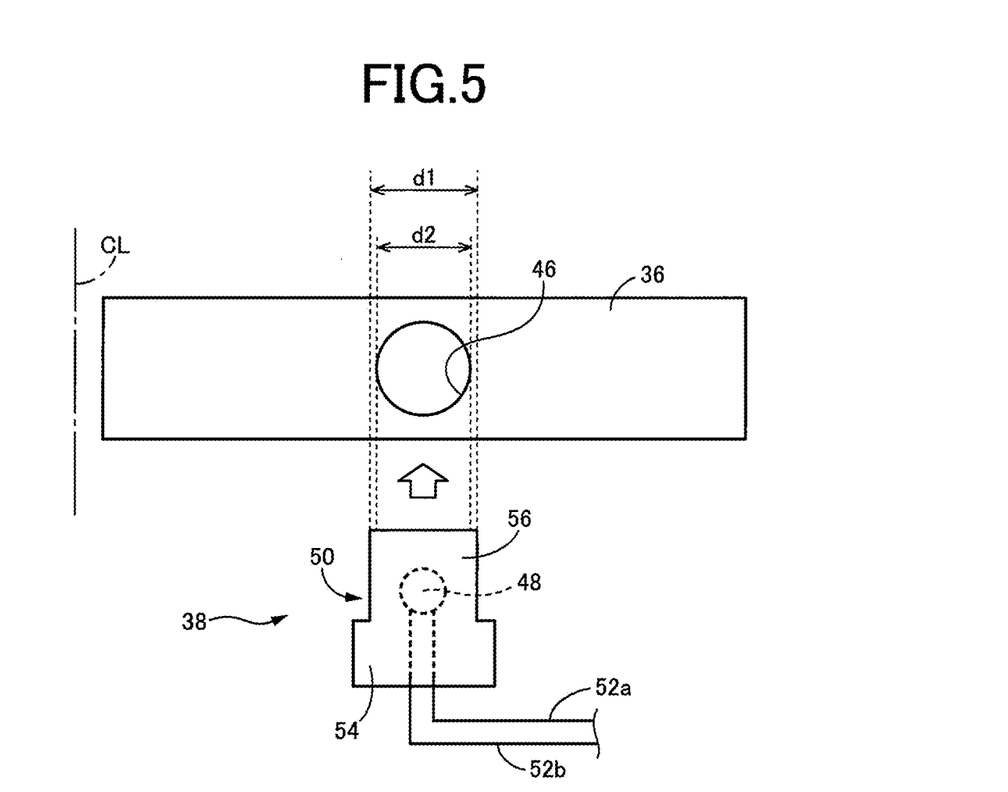
FIG. 5 is a view showing a dimensional relationship between the temperature sensor and the neutral busbar before the temperature sensor is attached to the neutral busbar.

FIG. 5 is a view showing a dimensional relationship between the temperature sensor 38 and the neutral busbar 36 in a state before the temperature sensor 38 is inserted in the round hole 46 of the neutral busbar 36. In this state before the protrusion portion 56 of temperature sensor 38 is inserted in the round hole 46, an outside diameter d1 of the protrusion portion 56 is slightly larger than an inside diameter d2 of the round hole 46. Thus, upon insertion of the protrusion portion 56 of temperature sensor 38 into the round hole 46 of the neutral busbar 36, the protrusion portion 56 is press-fitted in the round hole 46, so that the protrusion portion 56 is interference-fitted in the round hole 46, namely, the temperature sensor 38 is fixed to the neutral busbar 36 with an interference fit, after the protrusion portion 56 of temperature sensor 38 has been inserted into the round hole 46 of the neutral busbar 36. It is noted that the difference between the outside diameter d1 of the protrusion portion 56 and the inside diameter d2 of the round hole 46 is set to a suitable value that makes the protrusion portion 56 be interference-fitted in the round hole 46 after the insertion of the protrusion portion 56 into the round hole 46.

As described above, when the resin portion 40 is to be formed, the welded portion 26, the neutral busbar 36 and the temperature sensor 38 (that is attached to the neutral busbar 36) are immersed into the liquid resin in the mould 42. In this instance, the temperature sensor 36 is fixed in the round hole 46 of the neutral busbar 36 with the interference fit, so that it is possible to prevent the temperature sensor 38 from being deviated from a predetermined position relative to the neutral busbar 36 during formation of the resin portion 40, thereby resulting in an improved manufacturability. Further, since the resin comes into close contact with the neutral busbar 36 in vicinity of the thermistor element portion 48, the resin or air is unlikely to enter between the temperature sensor 38 and the neutral busbar 36 so that it is possible to suppress thermal resistance that could be increased by presence of the resin or air between the temperature sensor 38 and the neutral busbar 36, and accordingly to improve temperature followability of the temperature sensor 38.

As described above, in the present embodiment, the temperature sensor 38 is inserted in the round hole 46 provided in the neutral busbar 36, so that the thickness L1 of the portion covered by the resin portion 40 can be reduced by a distance by which the temperature sensor 38 is inserted in the round hole 46. Consequently, it is possible to reduce the amount of use of the resin required to form the resin portion 40 and to suppress increase of the size of the stator 16 or the electric motor MG.

In the present embodiment, the protrusion portion 56 protruding from the base portion 54 is inserted in the round hole 46. Thus, the distance by which the temperature sensor 38 is inserted in the round hole 46, i.e., a length of a portion of the temperature sensor 38 which is inserted in the round hole 46, can be made always constant. Further, the temperature sensor 38 is interference-fitted in the round hole 46, thereby making it possible to prevent the temperature sensor 38 from being removed from the round hole 46 after the temperature sensor 38 is attached to the neutral busbar 36. Still further, since the temperature sensor 38 is in close contact with the neutral busbar 36, it is possible to improve the temperature followability of the temperature sensor 38. Moreover, since the temperature sensor 38 is attached to the neutral busbar 36 to which an electric current is to be constantly applied during running of the vehicle, it is possible to improve the accuracy of detection of the temperature of the electric motor MG by the temperature sensor 38.

There will be described another embodiment of this invention. The same reference signs as used in the above-described embodiment will be used in the following embodiment, to identify the practically corresponding elements, and descriptions thereof are not provided.

Second Embodiment

Figure 6:
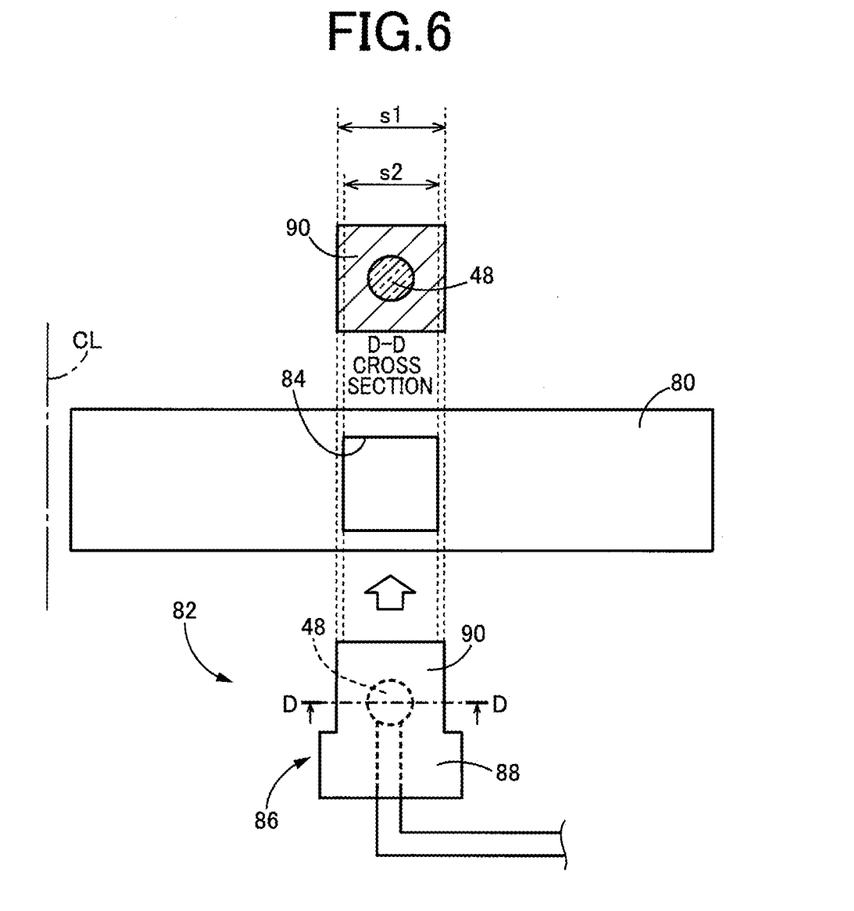
FIG. 6 is a view corresponding to the view of FIG. 5 and showing another embodiment of the present invention.

FIG. 6 is a view showing a neutral busbar 80 and a temperature sensor 82 attached to the neutral busbar 80 in this second embodiment of the invention. The constructions other than the neutral busbar 80 and the temperature sensor 82 are the same as those in the above-described first embodiment, so that the description thereof is not provided. It is noted that the neutral busbar 80 corresponds to "conductive member" recited in the appended claims.

As shown in FIG. 6, the temperature sensor 82 is inserted in a quadrangle hole 84 provided in the neutral busbar 80. The quadrangle hole 84 is formed to have a square cross-sectional shape. It is noted that the quadrangle hole 84 corresponds to "hole" recited in the appended claims.

The temperature sensor 82 includes the above-described thermistor element portion 48 and a sensor casing 86 provided to protect the thermistor element portion 48. The sensor casing 86 includes a plate-like base portion 88 having a predetermined thickness and a protrusion portion 90 protruding perpendicularly from the base portion 88 by a distance larger than a thickness of the neutral busbar 80. Thus, the sensor casing 86 has a convex shape (stepped shape) as a whole. FIG. 6 further includes a cross sectional view of the protrusion portion 90 of the temperature sensor 82 taken in line D-D. As shown in the cross sectional view taken in the line D-D, the protrusion portion 90 is formed to have a quadrangle (square) contour, so that the protrusion portion 90 of the temperature sensor 82 can be inserted into the quadrangle hole 84 of the neutral busbar 80. The protrusion portion 90 passes through the quadrangle hole 84 of the neutral busbar 80 in a state in which the temperature sensor 82 is attached to the neutral busbar 80. Thus, the hole (quadrangle hole 84) of the neutral busbar 80 in which the temperature sensor 82 is inserted is formed to have a rectangular cross-sectional shape, and the protrusion portion (protrusion portion 90) of the temperature sensor 82 is formed to have a rectangular cross-sectional shape corresponding to the cross sectional shape of the quadrangle hole 84. In the present second embodiment as in the above-described first embodiment, with the protrusion portion 90 of the temperature sensor 82 being inserted in the quadrangle hole 84 of the neutral busbar 80, the thickness L1 (see FIG. 2) of the resin portion can be reduced by a distance by which the protrusion portion 90 is inserted in the quadrangle hole 84. Consequently, it is possible to make it possible to reduce the amount of use of the resin required to form the resin portion, and to increase the surface area of the coil end 24 with which the coolant oil can be in contact, so that the electric motor MG can be cooled by the coolant oil with an improved cooling performance.

Further, in this state before the protrusion portion 90 of temperature sensor 82 is inserted in the quadrangle hole 84, a length s1 of a side of the protrusion portion 90 that is shaped to a quadrangular prism is slightly larger than a length s2 of a side of the quadrangle hole 84. Thus, upon insertion of the protrusion portion 90 of temperature sensor 82 into the quadrangle hole 84 of the neutral busbar 80, the protrusion portion 90 is press-fitted in the quadrangle hole 84, so that the protrusion portion 90 is interference-fitted in the quadrangle hole 84, namely, the temperature sensor 82 is fixed to the neutral busbar 80 with an interference fit, after the protrusion portion 90 of temperature sensor 82 has been inserted into the quadrangle hole 84 of the neutral busbar 82. Consequently, it is possible to prevent the temperature sensor 82 from being deviated from a predetermined position relative to the neutral busbar 80 during manufacturing process, and to make the temperature sensor 82 and the neutral busbar 80 being in close contact with each other whereby the temperature followability of the temperature sensor 82 can be improved. Thus, the present second embodiment also provides substantially the same effects as the above-described first embodiment.

While the preferred embodiments of this invention have been described in detail by reference to the drawings, it is to be understood that the invention may be otherwise embodied.

For example, in the above-described first embodiment, the round hole 46 provided in the neutral busbar 36 has a perfect circular shape in its cross section. However, the round hole 46 may be formed to have an elliptical-circular shape in its cross section. Further, in conformity with the shape of the round hole 46, the protrusion portion 56 may be formed to have an elliptical-circular shape in its cross section. In the above-described second embodiment, the quadrangle hole 84 provided in the neutral busbar 80 has a square shape in its cross section. However, the quadrangle hole 84 may be formed to have a rectangular shape in its cross section. Further, in conformity with the shape of the quadrangle hole 84, the protrusion portion 90 may be formed to have a rectangular shape in its cross section. Moreover, the hole provided in the neutral busbar does not necessarily have to be formed to have the circular or quadrangle shape in the cross section, but may be formed to have any other shape such as a triangular or trapezoid shape in the cross section. Similarly, the protrusion portion of the temperature sensor may be formed to have any cross sectional shape depending on the cross sectional shape of the hole of the neutral busbar.

In the above-described embodiments, each of the round hole 46 and quadrangle hole 84 of the neutral busbars 36, 80 is a through-hole formed through the neutral busbar in the thickness direction. However, each of the holes 46, 84 does not necessarily have to be a through-hole but may be a cutout or blind hole having a predetermined depth.

In the above-described embodiments, each of the round hole 46 and quadrangle hole 84 of the neutral busbars 36, 80 is a through-hole formed through inside the neutral busbar in the thickness direction. However, each of the holes 46, 84 may be constituted by a cutout or groove formed in an end surface of the neutral busbar, such that the temperature sensor is inserted or fitted in such a cutout or groove. In this modified arrangement, the cutout or groove serves as a hole in which the temperature sensor is inserted or fitted.

In the above-described embodiments, each of the sensor casings 50, 86 of the temperature sensors 38, 82 consists of a corresponding one of the base portions 54, 88 and a corresponding one of the protrusion portions 56, 90 so as to have a stepped shape as a whole. However, each of the sensor casings 50, 86 does not necessarily have to have a stepped shape. In connection of this, the temperature sensor in its entirety may be inserted in the hole provided in the neutral busbar. That is, at least part of the temperature sensor should be inserted into the hole of the neutral busbar.

It is to be understood that the embodiments described above are given for illustrative purpose only, and that the present invention may be embodied with various modifications and improvements which may occur to those skilled in the art.

NOMENCLATURE OF ELEMENTS

- 16: stator
- 18: stator core
- 20: stator coil (coil)
- 22: slot
- 26: welded portion
- 36; 80: neutral busbar (conductive member)
- 38; 82: temperature sensor
- 40: resin portion
- 46: round hole (hole)
- 54; 88: base portion
- 56; 90: protrusion portion
- 84: quadrangle hole (hole)
- MG: electric motor
- CL: rotation axis

What is claimed is:

1. A stator for an electric motor, the stator comprising:
   a tubular stator core having slots provided through the stator core in a direction of a rotation axis of the stator core;
   coils inserted through the slots;
   a conductive member electrically connected to the coils;
   a temperature sensor attached to the conductive member; and
   a resin portion provided to cover at least a part of the conductive member and at least a part of the temperature sensor,
   wherein the conductive member is provided with a hole that extends in the direction of the rotation axis of the stator core, and
   wherein the temperature sensor is inserted, at least a portion thereof, in the hole.

2. The stator according to claim 1,
   wherein the temperature sensor includes a base portion and a protrusion portion protruding from the base portion, and
   wherein the protrusion portion of the temperature sensor is inserted in the hole.

3. The stator according to claim 1, wherein the at least the portion of the temperature sensor is interference-fitted in the hole.

4. The stator according to claim 1, wherein the conductive member is a neutral busbar.

* * * * *